United States Patent
Watase

(10) Patent No.: US 8,540,301 B2
(45) Date of Patent: Sep. 24, 2013

(54) SUN VISOR

(75) Inventor: Sozaburo Watase, Kawagoe (JP)

(73) Assignee: Shoko-Bussan Co., Ltd., Kawagoe (JP)

( * ) Notice: Subject to any disclaimer, the term of this patent is extended or adjusted under 35 U.S.C. 154(b) by 0 days.

(21) Appl. No.: 13/284,459

(22) Filed: Oct. 28, 2011

(65) Prior Publication Data

US 2012/0133173 A1 May 31, 2012

(30) Foreign Application Priority Data

Nov. 30, 2010 (JP) ................................. 2010-7808

(51) Int. Cl.
*B60J 3/00* (2006.01)
(52) U.S. Cl.
USPC ......................................... 296/97.8
(58) Field of Classification Search
USPC ............ 296/97.6, 97.8, 97.11, 97.1; 160/132
See application file for complete search history.

(56) References Cited

U.S. PATENT DOCUMENTS

| 2,526,889 | A | * | 10/1950 | McComb | 296/97.2 |
| 2,733,763 | A | * | 2/1956 | Nygaard | 160/32 |
| 5,466,029 | A | * | 11/1995 | Zetterlund | 296/97.8 |
| 5,513,892 | A | * | 5/1996 | Thomas | 296/97.2 |
| 5,711,570 | A | * | 1/1998 | Wu et al. | 296/97.8 |
| 5,730,484 | A | * | 3/1998 | Robinson | 296/97.6 |
| 5,842,748 | A | * | 12/1998 | Cummins | 296/97.2 |
| 6,565,140 | B2 | * | 5/2003 | Wells | 296/97.2 |
| 2003/0015887 | A1 | * | 1/2003 | Yurko et al. | 296/97.8 |

FOREIGN PATENT DOCUMENTS

JP          11-091323 A      4/1999

* cited by examiner

*Primary Examiner* — Glenn Dayoan
*Assistant Examiner* — Pinel Romain
(74) *Attorney, Agent, or Firm* — Westerman, Hattori, Daniels & Adrian, LLP

(57) ABSTRACT

A sun visor can appropriately expand its light shielding area without requiring any auxiliary sun visor or the like and hence can be provided at low cost. The sun visor includes a sun visor main body section 101 including a container section 102 having a first width and an aperture section 103 having a second width greater than the first width and held in communication with the container section 102, and a translucent light shielding plate including a light shielding plate main body section 111, a pair of upper projections 112 arranged at the upper lateral ends of the light shielding plate main body section 111 and a pair of lower projections 113 arranged at the lower lateral ends of the light shielding plate main body section, and the width between the pair of upper projections 112 is greater than the second width.

8 Claims, 3 Drawing Sheets

200
SUN VISOR

The present application claims the benefit of Japanese Utility Model Registration Application No. 2010-7808, filed on Nov. 30, 2010, the entirety of which including the specification, the drawings and the abstract are incorporated herein by reference.

BACKGROUND OF THE INVENTION

1. Field of the Invention

The present invention relates to a sun visor to be arranged in front of the driver's seat or the front passenger seat of an automobile, a hybrid vehicle, an electric vehicle or the like.

2. Background Art

Sun visors are arranged in front of the driver's seat and also in front of the front passenger seat and at the rear side of the front windshield of a vehicle for the purpose of shielding light. Such a sun visor is normally fitted to the vehicle by means of a hinge structure in such a way that the vehicle driver can appropriately adjust the area where the front windshield is covered by the sun visor to regulate the extent of light shielding.

If, however, a sun visor having the above described structure and fitted to the vehicle is positionally adjusted so as to maximally cover the front windshield, sun light entering the vehicle may not be satisfactorily shielded depending on the slope of the road where the vehicle is running and the condition in which sun light enters so that consequently the driver's eyes can be significantly damaged regardless of the provision of a sun visor.

Various accessories for expanding the area by which a sun visor that is fitted to a vehicle can shield light have been proposed. For example, Patent Document 1 (JP-A-11-91323) discloses an auxiliary sun visor for an automobile. According to the Patent Document 1, a pair of pinching members that can be linked together by a rotary shaft is formed at a lower position of an existing sun visor and an auxiliary sun visor including a rectangular first light shielding plate formed by molding a translucent synthetic resin material and having a hinge section arranged at the top thereof so as to be swingably engaged with the rotary shaft member and a rectangular second light shielding plate formed by molding a translucent synthetic resin material and having a section laid on the first light shielding plate is fitted to the existing sun visor. The section of the second light shielding plate that is laid on the first light shielding plate is laterally movable relative to the first light shielding plate so as to allow the driver to obtain a desired light shielding area and a desired light transmissivity and adjust the light shielding area and the light transmissivity of the sun visor.

SUMMARY OF THE INVENTION

A known auxiliary sun visor as described above can be fitted to the existing sun visor of a vehicle to expand the area by which the sun visor shields light. However, such an auxiliary sun visor is an additional member that needs to be installed at additional cost.

Additionally, such an auxiliary sun visor is fitted to an existing sun visor by means of a pair of pinching members. However, the pinching members have only little holding power and the auxiliary sun visor can fall down while the vehicle is running to give rise to a risk of obstructing the driver's driving operation.

According to a first aspect of the present invention, the above-identified problems are dissolved by providing a sun visor including a sun visor main body section that includes a container section having a first width and an aperture section having a second width smaller than the first width and held in communication with the container section, and a translucent light shielding plate that includes a light shielding plate main body section, a pair of upper projections arranged at the upper lateral ends of the light shielding plate main body section and a pair of lower projections arranged at the lower lateral ends of the light shielding plate main body section, the width between the pair of upper projections being greater than the second width.

Preferably, according to a second aspect of the present invention, in a sun visor as defined above, the width between the pair of lower projections is greater than the second width.

Preferably, according to a third aspect of the present invention, in a sun visor as defined above, the translucent light shielding plate is made of a colored transparent synthetic resin material.

Preferably, according to a fourth aspect of the present invention, in a sun visor as defined above, the region between the pair of lower projections operates as a knob section.

In a sun visor according to the present invention, the translucent light shielding plate is contained in the sun visor main body section so that it can appropriately expand the light shielding area without requiring an additional auxiliary sun visor and hence it can be provided at low cost.

A sun visor according to the present invention does not require any fitting means such as pinching members and is free from a problem that an auxiliary sun visor drops while the vehicle is running to give rise to a risk of obstructing the driver's driving operation.

DETAILED DESCRIPTION OF THE PREFERRED EMBODIMENTS

Figure 1:
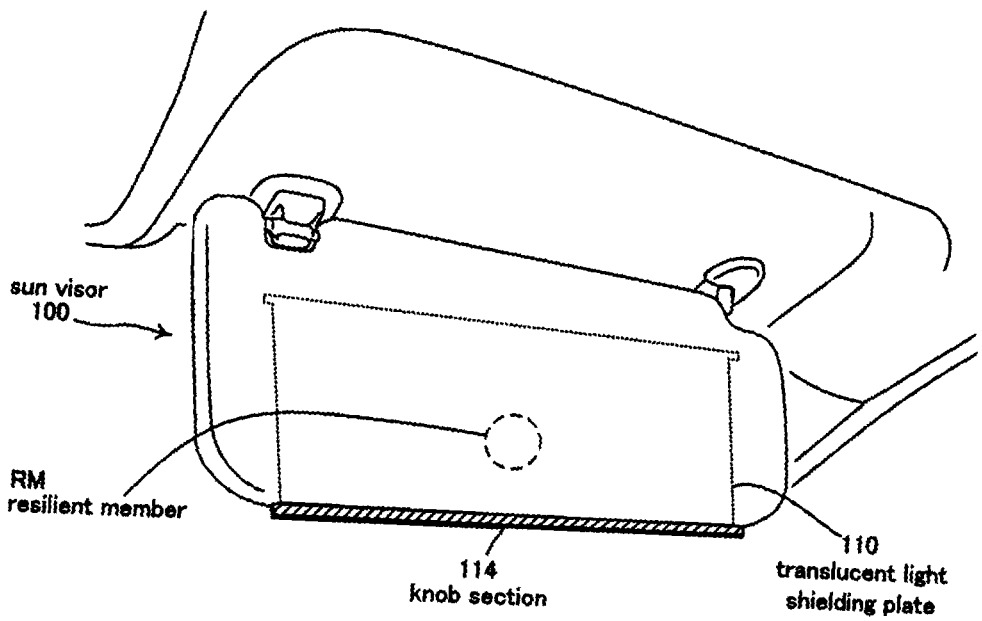
FIG. 1 is a schematic perspective view of a sun visor according to an embodiment of the present invention.
Figure 2:
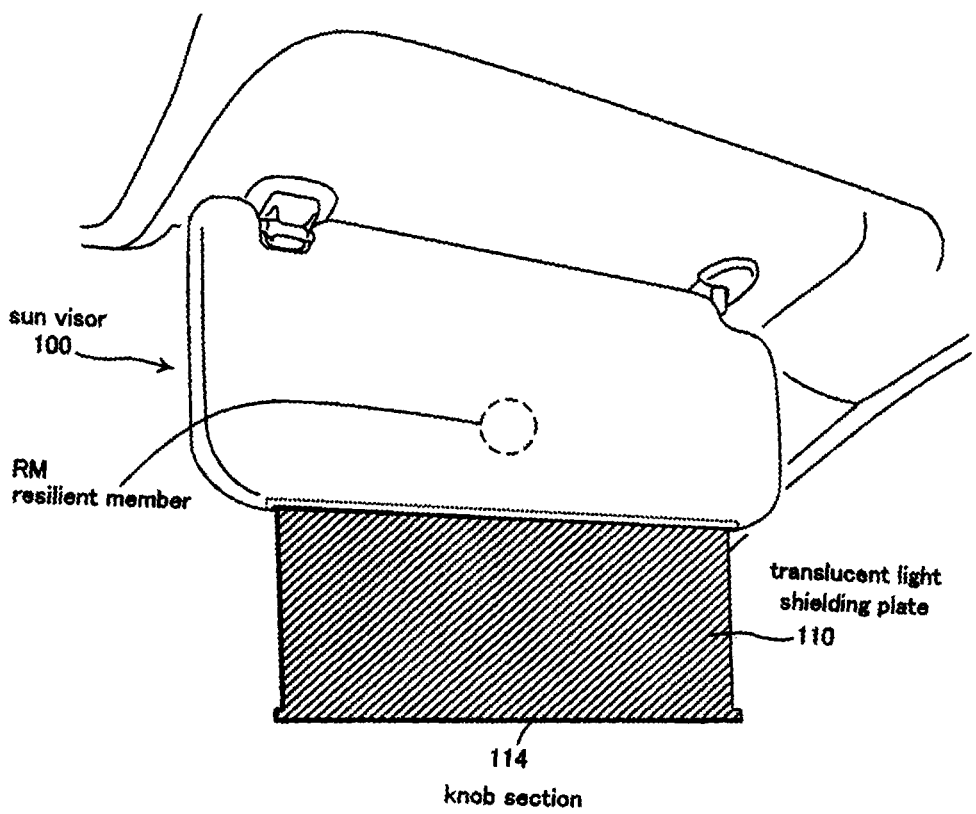
FIG. 2 is another schematic perspective view of the sun visor according to the embodiment of the present invention.

Now, the present invention will be described in greater detail by referring to the accompanying drawings that schematically illustrate a preferred embodiment of the present invention. FIG. 1 is a schematic perspective view of the sun visor 100 according to the embodiment of the present invention. FIG. 1 shows a translucent light shielding plate 110 contained in the main body section 101 of the sun visor 100. FIG. 2 is another schematic perspective view of the sun visor 100 according to the embodiment of the present invention. FIG. 2 shows the translucent light shielding plate 110 that is pulled out from the main body section 101 of the sun visor 100.

Figure 3:
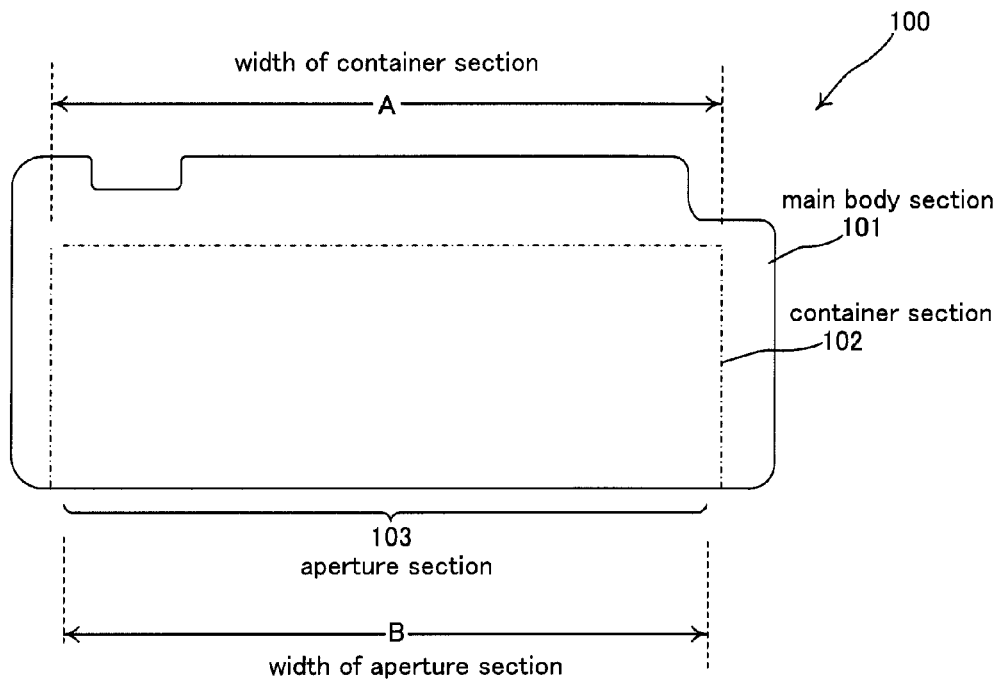
FIG. 3 is a schematic illustration of some of the components of the sun visor according to the embodiment of the present invention.
Figure 4:
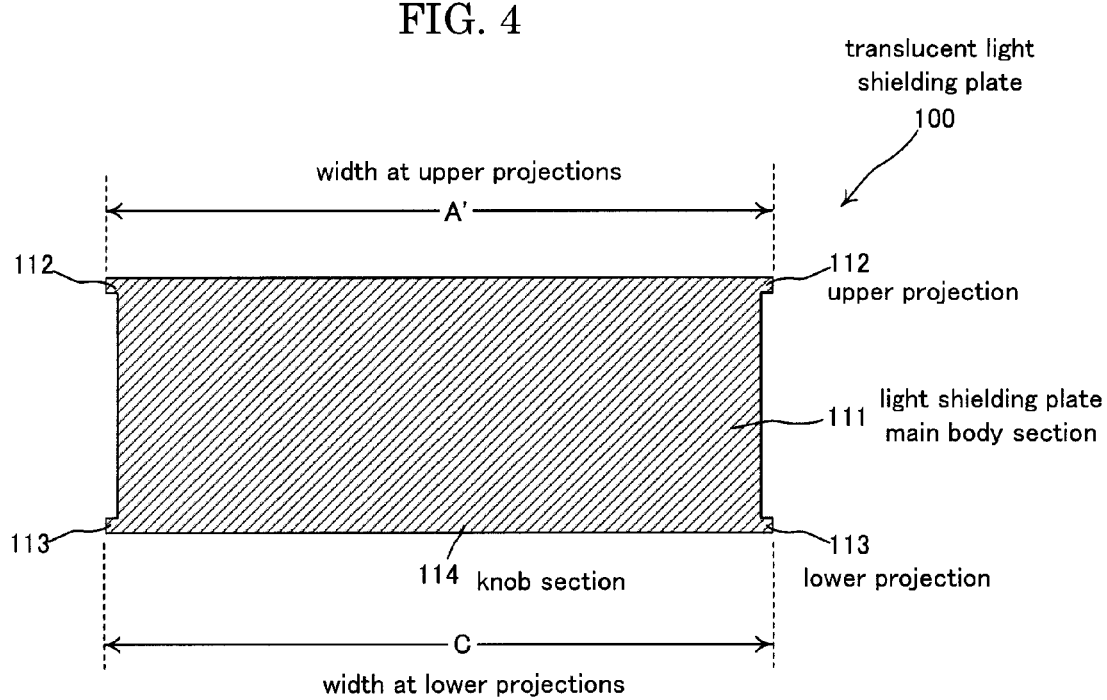
FIG. 4 is another schematic illustration of the some of the components of the sun visor according to the embodiment of the present invention.

FIG. 3 is a schematic illustration of the main body section 101 that is a component of the sun visor 100 according to the embodiment of the present invention. FIG. 4 is a schematic illustration of the translucent light shielding plate 110 that is another component of the sun visor 100 according to the embodiment of the present invention.

Figure 5:
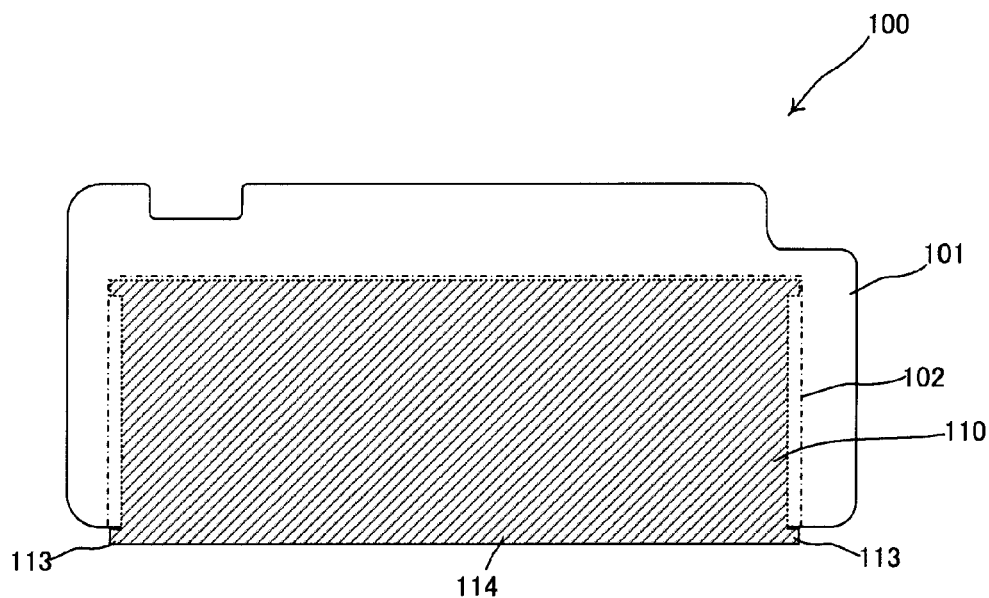
FIG. 5 is a schematic front view of the sun visor according to the embodiment of the present invention.
Figure 6:
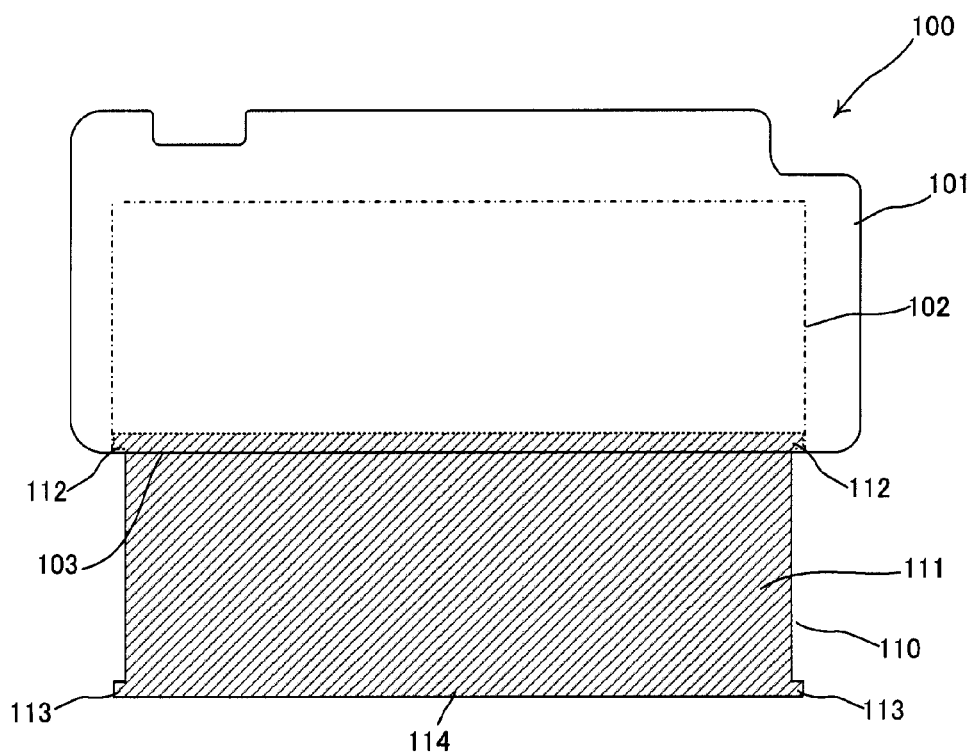
FIG. 6 is another schematic front view of the sun visor according to the embodiment of the present invention.

FIG. 5 is a schematic front view of the sun visor 100 according to the embodiment of the present invention in a state where the translucent light shielding plate 110 is contained in the main body section 101 of the sun visor 100. FIG. 6 is also a schematic front view of the sun visor 100 according to the embodiment of the present invention in a state where the translucent light shielding plate 110 is pulled out of the main body section 101 of the sun visor 100.

The sun visor 100 according to the embodiment of the present invention is to be arranged at the rear side of the front windshield of an automobile, a hybrid vehicle, an electric vehicle or the like and also in front of the driver's seat or the front passenger seat for the purpose of shielding light. Although not described in detail, the sun visor 100 is fitted to the ceiling of the passenger compartment by means of a hinge structure as schematically illustrated in FIGS. 1 and 2.

The main body section 101 of the sun visor 100 includes a container section 102 for containing a part of the translucent light shielding plate 110 and the remaining part of the translucent light shielding plate 110 is exposed to the outside from the main body section 101 through the aperture section 103 that is held in communication with the container section 102. The translucent light shielding plate 110 is made of a colored transparent synthetic resin material. In the container section 102, the translucent light shielding plate 110 is sandwiched and pressed by resilient members (not shown), such as urethane of the main body section 101 in such a way that the translucent light shielding plate 110 can be held to a desired position as it is pulled out of or pushed back into the container section 102.

When the driver judges that light is satisfactorily shielded by the main body section 101 of the sun visor 100, he or she keeps the sun visor 100 in a state as illustrated in FIG. 1. When, on the other hand, the driver judges that light is not satisfactorily shielded by the main body section 101 of the sun visor 100, he or she pulls out the translucent light shielding plate 110 by means of a knob section 114 and keeps the sun visor 100 in a state as illustrated in FIG. 2. When it is no longer necessary to shield light by means of the translucent light shielding plate 110 that is held in a state as illustrated in FIG. 2, the driver can put the translucent light shielding plate 110 back into the main body section 101 of the sun visor 100 by means of the knob section 114.

While the knob section 114 is structurally so arranged as to be flush with light shielding plate main body section 111 in this embodiment, alternatively the knob section 114 may structurally be so arranged as to be extended orthogonally from the light shielding plate main body section 111. In other words, it may be so arranged that the light shielding plate 110 show a L-shaped cross section by the light shielding plate main body section 111 and the knob section 114. With this arrangement, the driver can move the translucent light shielding plate 110 with ease by hooking the knob section 114 by means of fingers.

Now, the components of the sun visor 100 will be described in detail below by referring to FIGS. 3 and 4. The main body section 101 of the sun visor 100 is provided with a container section 102 having a first width (A) and an aperture section 103 held in communication with the container section 102 and having a second width (B) smaller than the first width (A).

On the other hand, the light shielding plate main body section 111 of the translucent light shielding plate 110 is provided with a pair of upper projections 112 arranged at the upper lateral ends of the light shielding plate main body section 111 and a pair of lower projections 113 arranged at the lower lateral ends of the light shielding plate main body section 111.

The translucent light shielding plate 110 shows a third width (A') at the pair of upper projections 112 that is greater than the second width (B). Thus, the upper projections 112 operate as stopper that prevents the translucent light shielding plate 110 from falling down from the main body section 101. The third width (A') is slightly smaller than the first width (A) so that the translucent light shielding plate 110 can freely move in the container section 102.

The translucent light shielding plate 110 shows a fourth width (C) at the pair of lower projections 113 that is greater than the second width (B). The region between the pair of lower projections 113 operates as the knob section 114 by which the driver can pull out the translucent light shielding plate 110 from and put it back into the container section 102. The knob section 114 having the fourth width (C) prevents the translucent light shielding plate 110 from being entirely put back into the container section 102.

The above dimensional relationships will be described in greater detail below by referring to FIGS. 5 and 6. While the translucent light shielding plate 110 is completely contained in the container section 102 in FIG. 5, in actuality, the translucent light shielding plate 110 would not be completely put into the container section 102 because the fourth width (C) at the pair of lower projections 113 is greater than the second width (B) of the aperture section 103.

Additionally, while the translucent light shielding plate 110 is maximally pulled out from the container section 102 in FIG. 6, the translucent light shielding plate 110 would not fall down from the container section 102 because the third width (A') at the pair of upper projections 112 is greater than the second width (B) of the aperture section 103.

As described above, the translucent light shielding plate 110 of the sun visor 100 according to the present invention is contained in the sun visor main body section 101 so that the light shielding area of the sun visor 100 can be appropriately expanded without additionally arranging any auxiliary sun visor or the like. Further, the sun visor 100 can be provided at low cost.

Additionally, the sun visor 100 according to the present invention does not require any fitting member such as pinching member and is free from the above described problems including the problem that an auxiliary sun visor falls down while the vehicle is running to give rise to a risk of obstructing the driver's driving operation.

What is claimed is:

1. A sun visor, comprising:
   a sun visor main body section that includes a container section having a first width and an aperture section having a second width smaller than the first width and held in communication with the container section;
   a translucent light shielding plate made of a single unitary piece of synthetic resin material that includes a light shielding plate main body section, a pair of upper projections arranged at upper lateral ends of the light shielding plate main body section and a pair of lower projections arranged at lower lateral ends of the light shielding plate main body section,
   a width between the pair of upper projections being greater than the second width, and
   at least one resilient member configured to press against a surface of said synthetic resin translucent light shielding plate such that said translucent light shielding plate is held to a desired position as the translucent light shielding plate is moved in to or out of said container section.

2. The sun visor according to claim 1, wherein the width between the pair of lower projections is greater than the second width.

3. The sun visor according to claim 1, wherein the translucent light shielding plate is made of a colored transparent synthetic resin material.

4. The sun visor according to claim 1, wherein the region between the pair of lower projections operates as a knob section.

5. The sun visor according to claim 4, wherein said knob section extends out of said container section such as to be exposed when said translucent light shielding plate is fully inserted into said container section, and wherein said knob section extends across substantially the entire width of said translucent light shielding plate.

6. The sun visor according to claim 5, wherein said knob section extends across the entire width of said translucent light shielding plate.

7. The sun visor according to claim 1, wherein said at least one resilient member includes a plurality or resilient urethane members arranged to sandwich and press against said translucent light shielding plate.

8. The sun visor according to claim 1, wherein said translucent light shielding plate that is made of a single unitary piece of synthetic resin material has a substantially I-shaped configuration with said main body section having a substantially uniform width, and said pair of upper projections arranged at the upper lateral ends of the light shielding plate main body section extending outwardly as a top of said I-shape and said pair of lower projections arranged at the lower lateral ends of the light shielding plate main body section extending outwardly as a bottom of said I-shape.

* * * * *